United States Patent [19]

Blockburger

[11] 4,136,415
[45] Jan. 30, 1979

[54] UNDERWATER RELEASE MECHANISM

[76] Inventor: James E. Blockburger, 290 Wiley Pl., Wyckoff, N.J. 07481

[21] Appl. No.: 792,213

[22] Filed: Apr. 29, 1977

[51] Int. Cl.² ............................................. B63B 21/52
[52] U.S. Cl. ................................ 9/8 R; 24/230 AP; 24/241 R; 24/241 PS; 294/83 AE
[58] Field of Search ....................... 9/8 R, 9, 320, 323; 294/83 R, 83 AE, 83 AB, 84, 86.17; 114/252, 294, 297, 310; 24/230 AP, 232, 241 PS, 241 R; 244/149, 151 B; 89/1.5 F, 1 B; 102/12, 13, 70 C; 340/4 R, 5 R, 16 C

[56] References Cited
U.S. PATENT DOCUMENTS

| | | | |
|---|---|---|---|
| 3,052,091 | 9/1962 | D'Ooge | 89/1 B |
| 3,504,407 | 4/1970 | Dawson | 114/294 |
| 3,540,676 | 11/1970 | Madey et al. | 9/9 |
| 3,990,344 | 11/1976 | Hansen | 89/1 B |

Primary Examiner—Trygve M. Blix
Assistant Examiner—Jesus D. Sotelo
Attorney, Agent, or Firm—Edward R. Weingram

[57] ABSTRACT

An underwater release mechanism for a shackle including a shaft releasably journaled in a casing and held in position by a frangible link to be spring biased to release a shackle hook upon remote actuation causing the link to fracture whereby the shackle is released and the release mechanism floats to the surface. The frangible link externally connected to the casing members to facilitate replacement of the frangible link and reuse of the release mechanism. A rope canister can be attached to the casing with one end of the rope tied to the shackle whereby after release the canister end of the rope will be tied to the float to mark the spot of the shackle. Also a force multiplier can be added to the release mechanism via a second retaining bracket and a second shackle hook to increase the casing load by a ratio of at least 5:1 as for example a release mechanism capable of a 400 pound load would have a 2000 pound load capacity. A safety shaft, manually releasable, can be added to the retaining bracket to prevent accidental release of the mechanism prior to its being installed under water.

10 Claims, 8 Drawing Figures

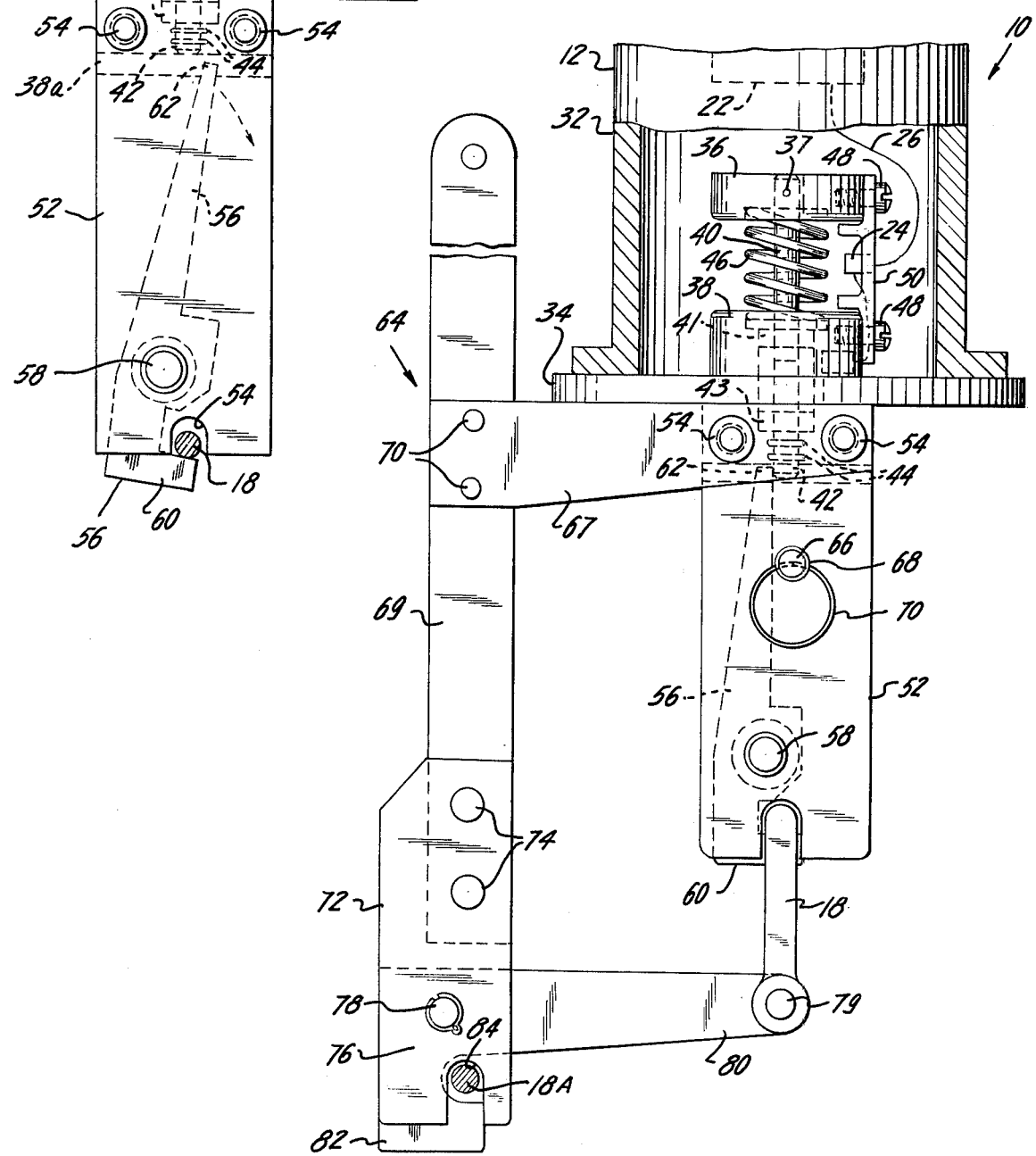

UNDERWATER RELEASE MECHANISM

BACKGROUND OF THE INVENTION

1. Field of the Invention

This invention relates to remotely-actuated release mechanisms and, more particularly, to release mechanisms which are adapted for underwater use.

2. Description of the Prior Art

Heretofore release mechanisms have used remotely actuated release devices of an explosive or non-explosive type, some manual and some having internally disposed frangible links. However, all of these release mechanisms were relatively complex and costly. Further, in many instances, little of the release mechanism is accessible and rebuilding of the mechanism is a major undertaking.

SUMMARY OF THE INVENTION

It is an object of the present invention to provide an improved release mechanism which overcomes the prior art disadvantages; which is simple, economical and reliable; which uses a relatively accessible frangible link; which uses a safety shaft to prevent accidental actuation release of the mechanism; which uses a force multiplier on the release mechanism to increase the loading by a ratio of 5:1; which improves replaceability of the frangible link; which uses a shaft to release the shackle hook; which is sealed from seepage; and which has a rope canister interconnectable between the shackle and the float to mark a spot upon actuation of the release mechanism.

Other objects and advantages will be apparent from the following description of the embodiments of the invention, and the novel features will be particularly pointed out hereinafter in the claim.

BRIEF DESCRIPTION OF THE DRAWINGS

This invention is illustrated in the accompanying drawings in which:

FIG. 4 is a diagrammatic side elevational view showing the operation of the release mechanism of the present invention.

FIG. 5 is a side elevational view, partly in section, of another embodiment of the release mechanism of the present invention showing a force multiplier.

DESCRIPTION OF THE INVENTION

Figure 1:
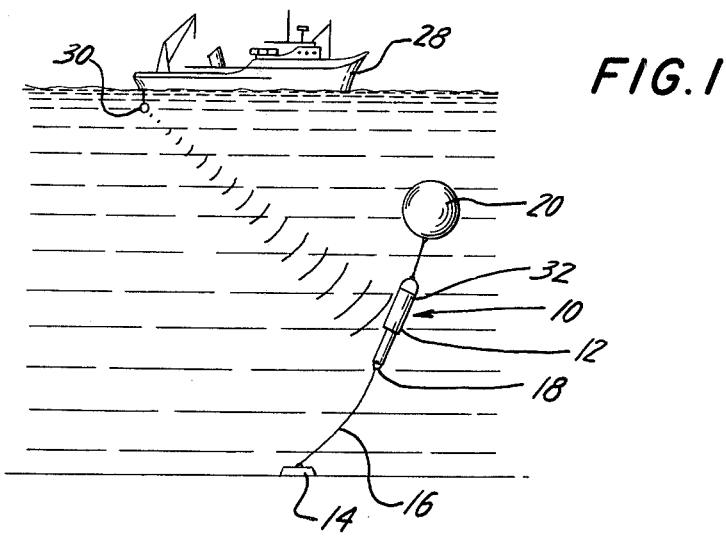
FIG. 1 is a diagrammatic view illustrating the release mechanism of the present invention.

In the illustrated embodiment of the invention shown in FIGS. 1-4 the release mechanism, designated generally 10, is depicted in FIG. 1 as being part of and associated with an instrument package 12 which is held underwater by an anchor or weight 14 connected by a chain or cable 16 via a shackle 18 to the release mechanism 10 located at the lower end of the package 12. A float 20 is connected to the package 12 at the upper end of the package 12 to keep the package in a raised position and off the bottom.

The release mechanism 10 includes suitable electronic components of an acoustic receiver and an actuator means of a type well known in the art preferably non-explosive for actuating the release mechanism 10 whereby the float 20 will lift the release mechanism 10 and the package 12, absent the shackle 18, chain 16 and anchor 14, to the surface of the water for retrieval.

Figure 2:
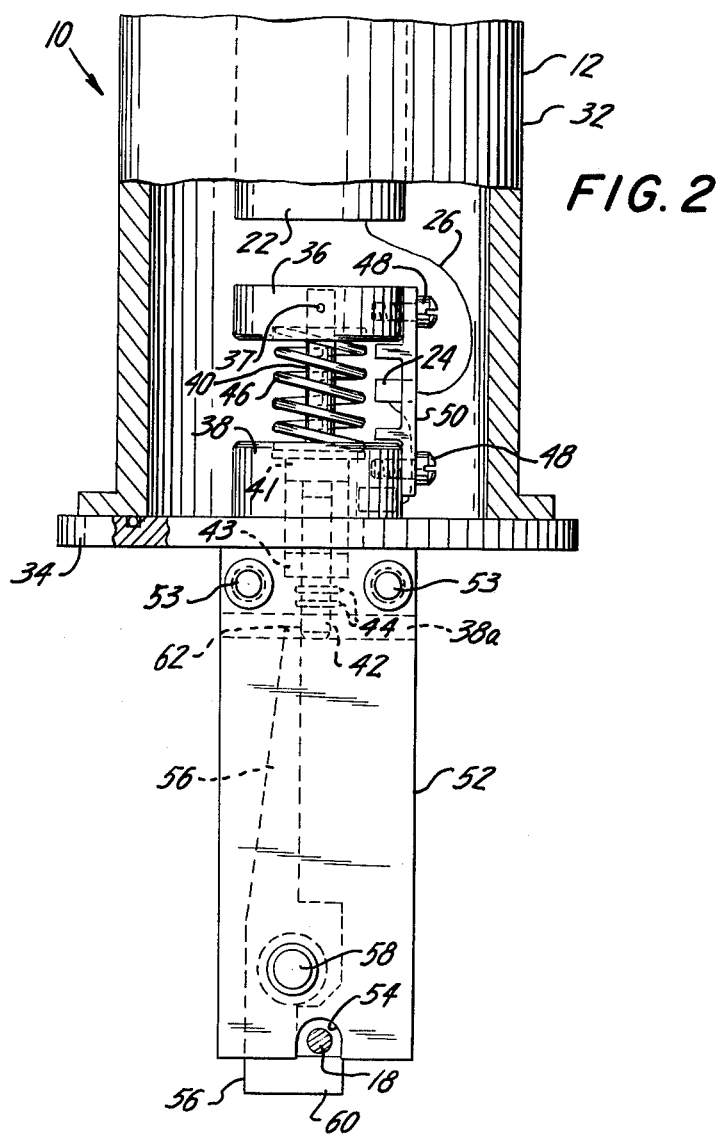
FIG. 2 is a side elevational view, partly in section, of the release mechanism of the present invention.

The acoustic receiver and actuator means for represented by the reference characters 22 and 24 respectively shown in FIG. 2 as interconnected by a suitable line 26.

When it is desired to retrieve the package 12, a surface ship 28, illustrated in FIG. 1 will send a coded signal via an acoustic transmitter 30 toward the package 12. The coded signal will be detected by the electronic acoustic receiver 22 which triggers the actuator means 24 to in turn activate the release mechanism 10 as described more fully hereinafter to release the shackle 18 from its hold of the package 12. Once free from the shackle 18 the package 12, and release mechanism 10 will be lifted to the surface of the water by the float 20 for retrieval by the ship 28.

The instrument package 12 is enclosed by a cylindrical casing 32 which is detachably connected to a horizontal base member generally indicated at 34. The release mechanism 10 is carried within the casing 32 and mounted upon the base 34 as is shown in FIGS. 1 and 2.

The release mechanism 10 includes an upper member 36, and a lower member 38 which is part of the base 34. A shaft 40 is affixed to the upper member 36 by pin 37 and journaled by and extending through the lower member 38. An underbase member 38A is part of and extends below the base 34 in alignment to have the shaft 40 extend outwardly therefrom with the tip 42 extending beyond the edge of member 38A. A pair of "O" rings 44, 44 seal the exit of the shaft 40 in the underbase member 38A to prevent any seepage along the shaft. The casing 32 will be sealingly connected to the top side of the base 34, while the underbase member 38A is part of the underside of the base 34 so that the whole of the internally disposed release mechanism 10 is waterproof. Shaft 40 is guided through base 34 by means of upper and lower oil bronze bushings 41 and 43 respectively.

A spring 46 illustrated in FIG. 2 is disposed about the shaft 40 with its ends nested; one in the upper member 36 and the other in the lower member 38. The spring 46 is held in compression by screws 48, 48 fastened to upper member 36 and lower member 38 which extend through a frangible link 50. The frangible link holds the upper member 36 in the lower of two positions so that the tip 42 of shaft 40 extends outwardly from the lower edge of the underbase member 38A a predetermined distance which can be substantially equal to the distance that the spring 46 is compressed. The frangible link 50 preferably carries the actuator means 24 thereon. Frangible links 50 are well known in the art, and are designed to be fractured responsive to any one of a number of stimuli, whether explosive or non-explosive, or electrical or thermal or the like. Also though an acoustic receiver 22 is used to signal the actuator means 24 suitable alternate signal means could be substituted therefor such as a trip wire or electrical signal or the like.

Figure 3:
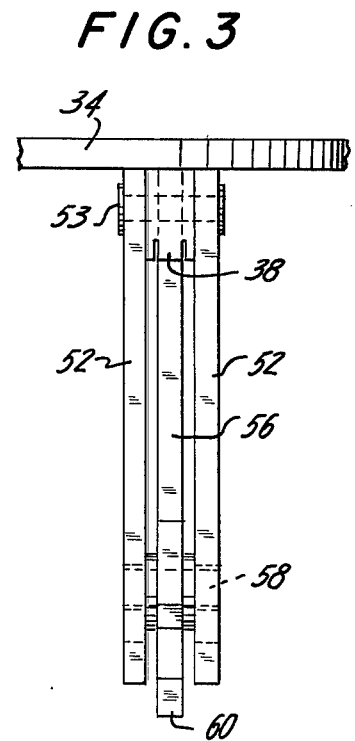
FIG. 3 is a front elevational view partly in section, of the release mechanism of the present invention.

Retaining brackets 52, 52 illustrated in FIGS. 2 and 3 are connected on either side of the underbase member 38A by two spaced fasteners 53, 53. The retaining brackets 52, 52 extend downwardly from the base 34 and are generally rectangularly shaped with aligned slots, 54, 54 formed at the bottom edges thereof so as to be open downwardly. A shackle hook 56 is disposed between the retaining brackets 52, 52 and pivotally connected thereto at pivot 58 located a short distance above and slightly to one side of the slots 54.

The hook 56 has a hooked end 60 which extends perpendicularly from one end substantially to overlap the opening of the slots 54 by completely crossing the same when in the locked position shown in FIG. 2. The other end 62 defines a tapered finger which terminates a short distance from the lower edge of the underbase member 38A. The tip 42 of the shaft 40 as shown in FIG. 2 in the extended position lies below and engages the end 62 of the hook 56 to prevent the hook 56 from rotating in a clockwise direction.

A shackle 18 is placed in the aligned slots 54 when the hook 56 was in the unlocked position which corresponds to the release position shown in FIG. 4. At this time, upper member 36 is raised and, therefore, the shaft tip 42 is raised and retracted from contacting the finger end 62 of the hook 56 so that the hook 56 rotates clockwise to uncover the slots 54 and permit insertion of the shackle 18 therein. Subsequently the hook is restored to its FIG. 2 locked position in which the hooked end 60 of shackle hook 56 lies across the slots 54 locking the shackle therein. The shackle 18 also prevents the hook 56 from rotating counterclockwise as shown in FIG. 2, while clockwise rotation of the hook 50 is prevented by the shaft tip 42 which is lowered when upper member 36 is lowered and held in the lowered position by screws 48 extending from frangible link 50. Once the hook 56 is locked in its FIG. 2 position the shackle 18 will be effectively locked within the slots 54.

Upon completion of the work by the instrument package 12 and when retrieval is desired the ship 28 shown in FIG. 1 will signal via transmitter 30 to the receiver 22 to trigger the actuator means 24 illustrated in FIG. 2. The actuator means 24 will cause the frangible link 50 to fracture as shown in FIG. 4 releasing its hold on the upper member 36 which along with the shaft 40 will be raised by the expansion of the spring 46 to place the shaft 40 in a retracted position. The tip 42 of the shaft 40 will be raised out of the path of the finger end 62 of the shackle hook 56 to unlock the same.

Once unlocked the hook 56 will be forced to rotate clockwise under the load of the shackle 18 pulling on the locked end 60. The top surface of the hooked end 60 is flat and without any obstruction which might catch on or prevent the sliding free movement of the shackle 18. Of course the float 20 is continuously providing an upward of lifting force to the release mechanism 10 and it is as much this upward force as that of the current or water forces that produces the separation of the shackle 18 from the released hooked end 60 of the hook 50. In any event the hook 56 will be caused to rotate clockwise to assume a release position shown in FIG. 4, and the shackle 18 will be dislodged from entrapment by the slots 54 and the hooked end 60, while the release mechanism 10 and the package 12 will under the influence of the float 20 be lifted to surface of the water for retrieval.

Restoring an actuated release mechanism 10 involves detaching the casing 32 to provide access to the fractured frangible link 50; replacing the spent actuator means 24 and frangible link 50 and installing the assembly of the frangible link 50 and actuator 24 by lowering member 36 and sliding the frangible link over screws 48, 48 extending from upper and lower members 26 and 38 so that the spring 46 will again be compressed to place the shaft 40 in the extended position with the tip 42 lowered into the path of the finger end 62 of the hook 56. Of course before connection of the new frangible link 50 either a new shackle 18 will have to be inserted into the opening of the slots 54 and the hooked end 60, or a two-piece shackle 18 can be used and connected at anytime merely by insertion of the open "U" member and subsequently connecting a nut and bolt to enclose the open end of the "U" member. Thereafter the release mechanism 10 and associated package 12 is again ready for use.

Figure 6:
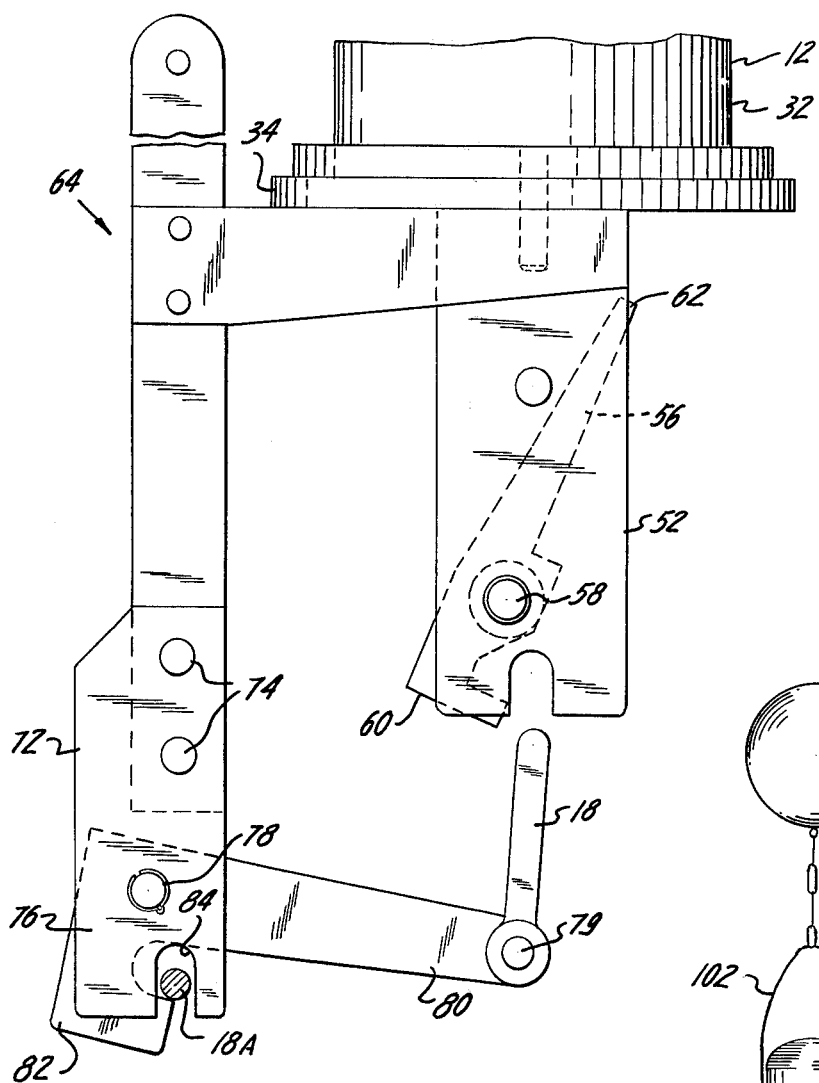
FIG. 6 is a diagrammatic view of the force multiplier release mechanism of FIG. 5 showing the operation thereof.

A second embodiment of the present invention is illustrated in FIGS. 5 and 6 wherein a force multiplier structure 64 is shown. The reference characters set forth in the first embodiment shown in FIGS. 1–4 will be used for like components. Accordingly a release mechanism 10 will be associated with an instrument package 12 which release mechanism can have a capacity of up to five (5) times as large as that previously described, due to the increased load carrying and release capabilities of the force multiplier 64.

A safety pin or shaft 66 is connected in aligned apertures 68, 68 formed in the retaining brackets 52, 52 and vertically above the slots 54 and pivot 58 and slightly above the mid-length of the bracket 52. A pull ring 70 is connected to one end of the pin 66 for manual removal, as desired, usually before the structure is placed in the water. Of course, the safety shaft 66 can be added to any release mechanism and will render shackle release impossible whether or not the release mechanism 10 is actuated. This is so because the shaft 66 lies across the path of the hook 56 and prevents the hook from pivoting clockwise, thus, preventing removal of the shackle 18 from the retaining brackets 52. However, for normal underwater operation of the release mechanism 10 and the force multiplier structure 64 the safety shaft 66 will have to be first removed.

A horizontal brace 67 is connected by fasteners 54, 54 to the upper end of the retaining brackets 52 to extend along the underside of the base 34 and beyond to carry a vertical standard 69 which is connected thereto by fasteners 70, 70. The vertical standard 69 extends parallel to the retaining bracket 52 and at its upper end can carry additional instruments or floats or the like. At the lower end of the standard 69 a retaining plate 72 is connected by fasteners 74, 74. A second shackle hook 76 is pivotally connected to the plate 72 by pivot 78 to normally lie horizontally parallel and underneath the brackets 52. Shackle hook 76 is held in that position by a shackle 18 pivotally connected at 79 to the outer end 80 of shackle hook 76. Shackle 18 is locked in position within the slots 54 by the hooked end 60 of the first shackle hook 56. The hook 56 is prevented from rotating by the tip 42 of shaft 40 and thus remains in locked position as shown in FIG. 5 until actuation of the release mechanism 10. The second shackle hook 76 lies across the retaining plate 72 and has an outwardly turned end 82 which is curved backwardly and around in the direction of the end 80 so as to lie across the bottom opening of a slot 84 which slot is formed to extend upwardly from the bottom edge of the plate 72. A shackle 18A is locked within the slot 84 by the hooked end 82 of hook 76.

Actuation of the release mechanism 10 as described hereinbefore, will produce successive release of the shackles 18 and 18A to permit a suitable float 20 to lift the structure 64 including the release mechanism 10 and package 12 to the surface for retrieval. The disposition and location of the second shackle hook 76 acts as a moment arm to increase the load carrying capacity by a ratio of 5:1 whereby an ordinary load carrying capacity of say 400 pounds can be increased to 2000 pounds.

FIG. 6 illustrates the force multiplier structure 64 in double released position wherein actuation of the release mechanism 10 raises the tip 42 to permit clockwise rotation of hook 56 to release the shackle 18, which in turn permits the hook 76 to rotate clockwise to release the shackle 18A.

Figure 7:
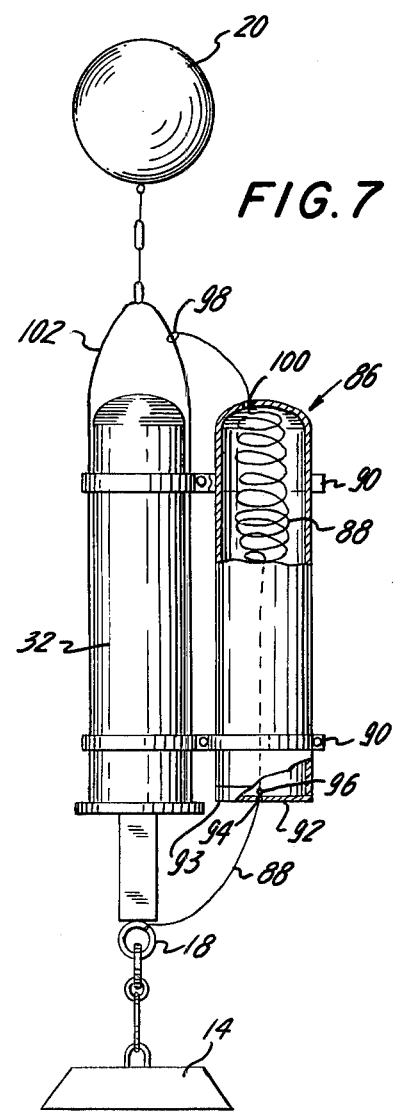
FIG. 7 is a side elevational view, partly in section, of a rope canister embodiment of the release mechanism of the present invention.
Figure 8:
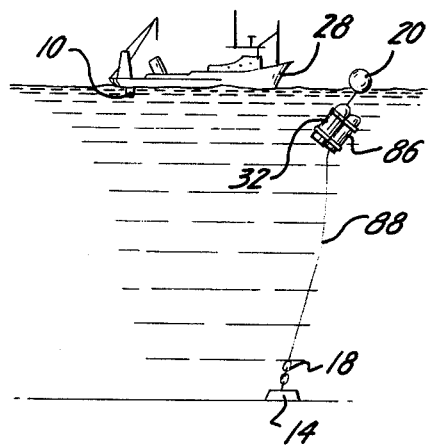
FIG. 8 is a diagrammatic representation of the rope marking the shackle spot after the release mechanism has been removed.

Another embodiment of the present invention is shown in FIGS. 7 and 8 wherein the embodiment of the invention depicted in FIGS. 1-4 is shown with the addition of a rope canister 86 which carries upwards of 200 feet of non-kink Dacron braided rope, designated generally 88. Clamping means 90, 90 affix the rope canister 86 parallel to the casing 32 at approximately the same heights. The rope 88 has a free end extending from the bottom of the canister 86 to be tied to the part of shackle 18 projecting from the bracket 52 and hook 56. The remainder of the rope is coiled within the canister.

A rubber membrane 92 is connected across the outside of the canister 86 at the bottom thereof by hose clamp 93, and has a slit 94 therein through which the outer end of the rope 88 is passed and knotted as at 96 to keep the rope 88 from accidentally sliding out of the canister 86. The bitter end 98 of the rope passes through opening 100 in the top of the canister 86 and is fixed to the bail 102 of float 20. Actuation of the release mechanism 10 (see FIG. 4) will result in the shackle 18 dropping to the bottom of the water and the rope 88 will continue to pay out of the canister 86 until the release mechanism 10 is retrieved by the boat upon reaching the surface which is assumed to be less than 200 feet from the bottom. After retrieval of the release mechanism 10 and package 12 a rope will be attached via the bitter end 98 to a shackle 18 be it the position of a wellhead, valve, wreck or the like for ease in relocating the spot, as shown in FIG. 8.

It will be understood that various changes in the details, materials, arrangements of parts and operating conditions which have been herein described and illustrated in order to explain the nature of the invention may be made by those skilled in the art within the principles and scope of the invention.

What is claimed is:

1. An underwater release mechanism for a shackle comprising:
   (a) a casing having an upper and a lower member;
   (b) a shaft affixed to the upper member and shiftably journaled to the lower member from a normally extended position to a retracted position;
   (c) a frangible link externally connected between the upper and the lower members;
   (d) a spring disposed between the upper and the lower members and held compressed therebetween by the link;
   (e) a retaining bracket affixed to the casing below the lower member;
   (f) a shackle hook pivotally connected to the retaining bracket and lockable by the end of the shaft when the shaft is in its extended position and releasable when the shaft is in its retracted position, said shackle hook having a hook end;
   (g) a shackle slot having an open end formed in the free end of the retaining bracket to receive a shackle normally held captive therein by the hooked end of the shackle hook lying adjacent to and overlapping the slot;
   (h) actuating means carried in the casing to operate responsive to a remotely induced signal to cause the link to fracture and force the shaft into the retracted position releasing the shackle hook to permit the hook to rotate its hooked end away from the shackle whereby a shackle will be separated from the release mechanism.

2. The combination claimed in claim 1 wherein:
   (a) the retaining bracket includes a pair of brackets;
   (b) the shackle hook is pivotably mounted between the brackets;
   (c) a slot is formed in the end of each of the brackets in alignment with each other; and
   (d) the hooked end extends below the slots by a predetermined distance to permit the shackle transversely to extend across the slots and to be normally non-removably held therein by the hooked end of the shackle hook.

3. The combination claimed in claim 2 wherein:
   (a) the frangible link is replaceably mounted and adapted to be replaced after fracture; and
   (b) the spring is disposed about the shaft; and
   (c) the shaft is adapted to hold the upper member and the spring to the casing after the link fractures.

4. The combination claimed in claim 3 wherein:
   (a) the actuating means is operated responsive to a remote energy signal; and
   (b) a plurality of O-rings is disposed about the shaft to seal the lower member from seepage from the water.

5. The combination claimed in claim 1 wherein:
   (a) a canister is connected to the casing;
   (b) a rope is releasably stored in the canister with one end affixed to a shackle affixed under the water; and
   (c) a float is attached to the casing to pull the casing and canister to the surface upon release of the shackle whereby the rope will be payed out and the end in the canister releasable therefrom to be fastened to the float to mark the spot of the shackle's location in the water.

6. The combination claimed in claim 1 including:
   (a) a second retaining bracket affixed to and extending in spaced relation from the first retaining bracket;
   (b) a second shackle hook having a hooked end pivotally mounted to the second retaining bracket;
   (c) a first shackle connected to the free end of the second shackle hook and normally held captive by the shackle hook pivotally connected to the first retaining racket, so that release of the first shackle will produce release of any other shackle held captive between the second bracket and hooked end of the second shackle hook.

7. The combination claimed in claim 6 wherein:
   (a) the first shackle hook is disposed vertically;
   (b) the second shackle hook is disposed horizontally; and
   (c) the first and second shackle hooks when released will rotate freely under the load of the first shackle and the other shackle held by the second shackle hook.

8. The combination claimed in claim 6 wherein:
(a) the retaining bracket includes a pair of brackets;
(b) the shackle hook is pivotably mounted between the brackets;
(c) a slot is formed in the end of each of the brackets in alignment with each other; and
(d) the hooked end extends below the slots by a predetermined distance to permit the shackle transversely to extend across the slots and to be normally non-removably held therein by the hooked end of the shackle hook.

9. The combination claimed in claim 8 wherein:
(a) the frangible link is replaceably mounted and adapted to be replaced after fracture; and
(b) the spring is disposed about the shaft; and
(c) the shaft is adapted to hold upper member and the spring to the casing after the link fractures.

10. The combination claimed in claim 1 wherein:
(a) a safety shaft is connected in the retaining bracket transversely of the shackle hook to normally prevent the hook from rotating to release the shackle; and
(b) the safety shaft is manually releaseable.

* * * * *